United States Patent [19]

Nishimoto

[11] 4,419,008
[45] Dec. 6, 1983

[54] PHOTOGRAPHIC COLOR PRINTER

[75] Inventor: Kanichi Nishimoto, Wakayama, Japan

[73] Assignee: Noritsu Koki Co., Ltd., Wakayama, Japan

[21] Appl. No.: 271,947

[22] Filed: Jun. 9, 1981

[30] Foreign Application Priority Data

Jun. 16, 1980 [JP] Japan .................................. 55-80128

[51] Int. Cl.³ .............................................. G03B 27/80
[52] U.S. Cl. .......................................... 355/38; 355/71
[58] Field of Search ....................... 355/32, 38, 68, 77, 355/71

[56] References Cited

U.S. PATENT DOCUMENTS 3,083,614  4/1963  Veit ......................................... 355/38
4,264,195  4/1981  Tokuda et al. ........................ 355/38

Primary Examiner—Richard A. Wintercorn
Attorney, Agent, or Firm—William E. Jackson

[57] ABSTRACT

An improved printer for exposing and printing a color printing paper is disclosed. Printing operation is performed with a certain color balance properly maintained by means of a cut filter assembly comprising three cut filters of a yellow filter, magenta filter and cyan filter each of which is actuated by signals delivered from a plurality of color photo sensors. During the printing operation two light beam flux reducing filters contained in the cut filter assembly are put in use under such an operating condition that the intensity of a light beam coming up from a light source is previously magnified to a certain level so as to properly fit a negative color film which has an overexposure when a photograph is taken, wherein one of said light beam flux reducing filters is adapted to be protruded into a light beam passage prior to opening a shutter when it is found that the negative color film has a normal exposure, while the other one is adapted to be protruded into said light beam passage together with said first one at the same time when it is found that the negative color film has an underexposure. Thus quick printing is ensured with the minimized fluctuation in printing time, maintaining an excellent color balance, irrespective of the fact that the negative color film has either an overexposure or underexposure when the intended photograph has been taken.

6 Claims, 3 Drawing Figures

PHOTOGRAPHIC COLOR PRINTER

BACKGROUND OF THE INVENTION

1. Field of the Invention

The present invention relates to an improved printer for exposing and printing a photosensitive color printing paper and more particularly relates to a printer which is improved such that printing operation is performed with a certain color balance properly maintained by means of a cut filter assembly comprising three cut filters of a yellow filter, magenta filter and cyan filter, wherein two light beam flux reducing filters contained in said cut filter assembly are put in use during the printing process under such an operation condition that the intensity of a light beam coming up from a light source for exposure is previously magnified to a certain level so as to properly fit a negative color film which has an overexposure when a photograph is taken, said light beam flux reducing filters being adapted to be protruded into a light beam passage prior to opening a shutter, whereby quick printing is ensured with the minimized fluxtuation in printing time, maintaining an excellent color balance irrespective of any excessive or insufficient exposure to which the negative color film is subjected.

2. Description of the Prior Art

As will be well known, the conventional printer for exposing and printing a photosensitive printing paper (hereinafter referred to as printing paper) for a negative color film is commonly equipped with a cut filter assembly comprising a yellow filter, magenta filter and cyan filter in order to ensure a color balance.

Usually, the above-described conventional printer which is widely used throughout the relevant industries at present takes at least about 0.08 second until successive operations of the three cut filters are initiated and completed by means of a plurality of color photo sensors which are adapted to detect a light beam which has passed through the negative color film.

Due to an overexposure or underexposure to which a color photographic film is subjected when a photograph is taken there is caused a wide range of fluctuation in printing time, that is, exposure time for the printing paper. Thus, for instance, a negative color film which has had an underexposure due to a shortage in exposing time when taking a photograph should have a short printing time which is restricted by the minimum operation time required for operating the cut filter assembly. On the other hand, with respect to a negative color film which has had an overexposure due to an excessive exposing time when taking a photograph, an exposure is applied by magnifying the intensity of a light beam from a light source in order to reduce the printing time which usually amounts to several seconds. This causes the negative color film which has had an underexposure to be exposed to the printing light beam for a shorter time than the minimum operation time of the cut filter assembly. Thus it has been pointed out as drawbacks or disadvantages with the conventional printer that excessive exposure is applied and thereby printing is performed with a color balance and contrast maintained in an undesirable manner.

In order to obviate the drawbacks or disadvantages as described above, proposals have been heretofore made such that a light beam flux reducing filter is put in use when it is found that a negative color film has an underexposure, whereas printing time is prolonged when it is found that a negative color film has an overexposure, provided that the intensity of a light beam from a light source incorporated in the printer is predetermined under such an operation condition that a printing paper is exposed to a light beam with the use of a negative color film which has had a normal exposure and development.

However, the proposals as described above have an unavoidable drawback that a longer time is taken for printing when it is found that a negative color film has an overexposure. The aforesaid drawback becomes more and more remarkable as a demand for photographic film has been substantially increased due to the latest quick and wide spread of cameras. Hence, sincere requests have been raised from the users of printers for obviating these drawbacks and disadvantages and then improving their operational performances.

SUMMARY OF THE INVENTION

Thus the present invention has been made in view of the current background relative to the conventional printers as described above. Specifically, the present invention consists in an printer for printing a printing paper with a certain color balance properly maintained by means of a cut filter assembly incorporated therein, said cut filter assembly comprising three cut filters of a yellow filter, and magneta filter and cyan filter each of which is actuated by signals delivered from a plurality of color photo sensors (light beam intensity and color discriminating optical sensors), wherein two light beam flux reducing filters contained in said cut filter assembly are put in use under such an operating condition that the intensity of a light beam coming up from a light source for exposure is previously magnified to a predetermined level so as to properly fit a negative color film which has an overexposure when a photograph is taken, and printing operation is performed such that the two light beam flux reducing filters are protruded into the light beam passage by depressing an operation start button so as to substantially reduce the light beam from the light source prior to opening a shutter in accordance with the signals from the color photo sensors, when it is found that the negative color film has an underexposure when a photograph is taken, one of said two light beam flux reducing filter is protruded into the light beam passage so as to considerably reduce the light quantity from the light source prior to opening the shutter, when it is found that the negative color film has a normal exposure when a photograph is taken, and no light beam flux reducing filter is protruded thereinto for the purpose of reducing the light quantity from the light source, when it is found that the negative color film has an overexposure when a photograph is taken, whereby a period of time required for printing is substantially reduced.

Thus it is the first object of the present invention to provide a printer which is constructed such that printing is performed therein for an overexposed negative color film within a substantially reduced period of time without any loss in color balancing with the use of a light source of which intensity is properly adjusted to correctly fit the negative color film which has had an overexposure when a photograph is taken.

It is the second object of the present invention to provide a printer which is constructed such that printing operation is performed in the same manner as the conventional printer, wherein the former is provided wirh two light beam flux reducing filters incorporated therein, one of them being put in use when printing is performed with a negative color film which has a normal exposure, while the other one being in use together with the first one when printing is performed with a negative color film which has an underexposure.

It is the third object of the present invention to provide a printer which is operated at a high efficiency without any skilled labor and careful attention required so that an excellently printed photograph is ensured.

It is another object of the present invention to provide a printer which is simple in structure and thereby is manufactured at an inexpensive cost.

These and other objects, feature and advantage of the present invention will become apparent to those skilled in the art from reading of the following description of the preferred embodiment of the present invention, taken in conjunction with the accompanying drawings.

BRIEF DESCRIPTION OF THE INVENTION

The accompanying drawings illustrate a printer in accordance with a preferred embodiment of the present invention, wherein parts and components which are insignificant for the understanding of the invention by any expert in the art are eliminated from the drawings for the purpose of simplification.

FIG. 1 is a partly sectioned front view of the printer in accordance with the present invention.

FIG. 2 is a perspective view of a cut filter assembly and light adjusting filters in a disassembled state, said cut filter assembly containing two light beam flux reducing filters which are essetial parts for the present invention, and FIG. 3 is a plane view of the cut filter assembly, shown in an enlarged scale, wherein some parts and components are eliminated from the drawing for the purpose of simplification.

DESCRIPTION OF THE PREFERRED EMBODIMENT

Now the present invention will be described in more details with reference to the drawings which illustrate the structure of a printer in accordance with the invention.

Figure 1:
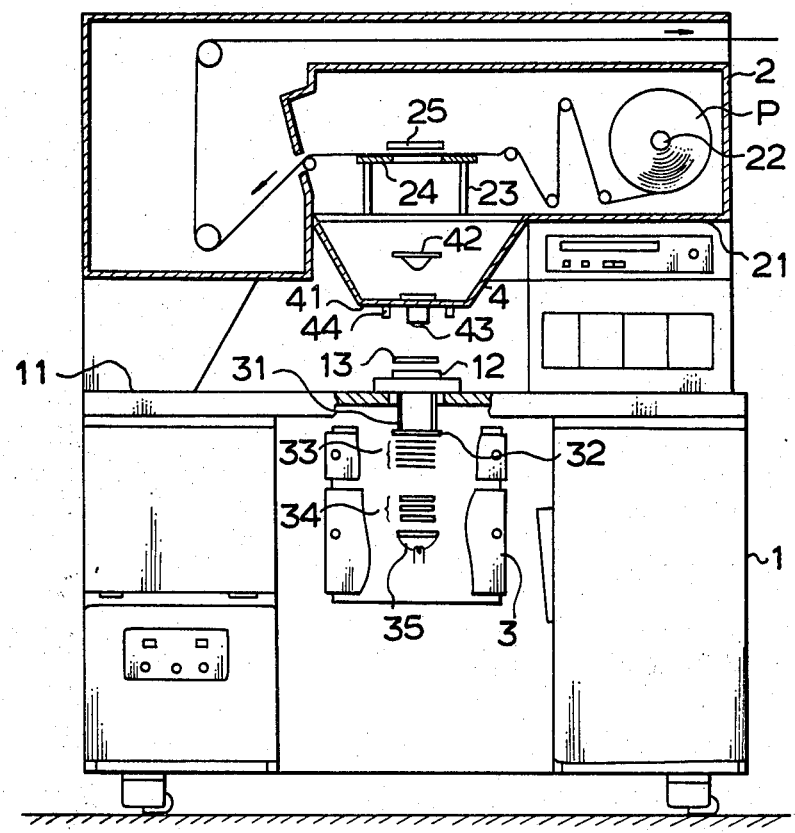

In FIG. 1 the reference numeral 1 designates a stand and the reference numeral 2 does a dark box fixedly mounted on an upper plate 11 of the stand 1. A light source box 3 is disposed below the upper plate 11 of the stand 1 and a lens box 4 is disposed below a lower plate 21 of the dark box 2, said light source box 3 and lens box 4 being firmly connected to the upper plate 11 and lower plate 21 respectively.

A roll of color photographic printing paper P is carried by means of a support shaft 22 at the right and portion in the dark box 2. The printing paper P is intermittently unrolled in the direction as indicated with an arrow mark, and when it advances on a paper mask 24 mounted on a paper deck 23 to be exposed to a light beam which has just entered thereto, it is firmly clamped between the paper mask 24 and paper retainer 25 which is adapted to cooperate with the former.

Further a shutter 42 is disposed in the lens box 4, an optical system (lens system) 43 is disposed at the central part of the lower plate 41 of the lens box 4 and a plurality of color photo sensors 44 which operate a cut filter assembly 33 and restore a shutter 42 to the original position are disposed on the bottom of the lower plate 41 in the vicinity of the optical system 43 in the same manner as those in the conventional printer.

Furthermore a mirror tunnel 31 is disposed coaxially related to the shutter 42 and optical system 43, being secured to the upper plate 11 of the stand 2 at the central part of the light source box 3 and a diffusion plate 32 is located at the lower end of the mirror tunnel 31 in the light source box 3 in the same manner as those in the conventional printer. Below the diffusion plate 32 is disposed a cut filter assembly 33 which represents a characteristic feature of the present invention, said cut filter assembly 33 being illustrated in FIGS. 2 and 3. Further, below the cut filter assembly 33 is disposed light adjusting filters 34 which have the same structure as those incorporated in the conventional printer. Furthermore, below the light adjusting filters 34 is disposed a light source lamp 35 such as halogen lamp or the like which represents another characteristic feature of the present invention, said light source lamp 35 being such that its lightening intensity is previously magnified to a predetermined level so as to properly fit a negative color film which has had an overexposure when a photograph is taken. It is to be noted that a negative color film carrier 12 and negative color film mask 13 are arranged above the mirror tunnel 31 in the same manner as those in the conventional printer.

Figure 2:
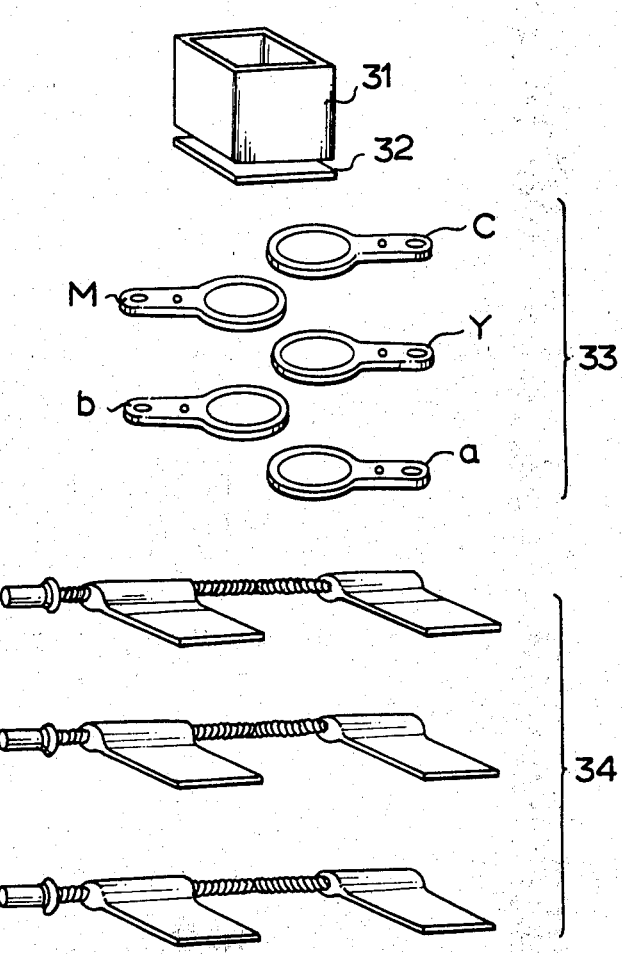
Figure 3:
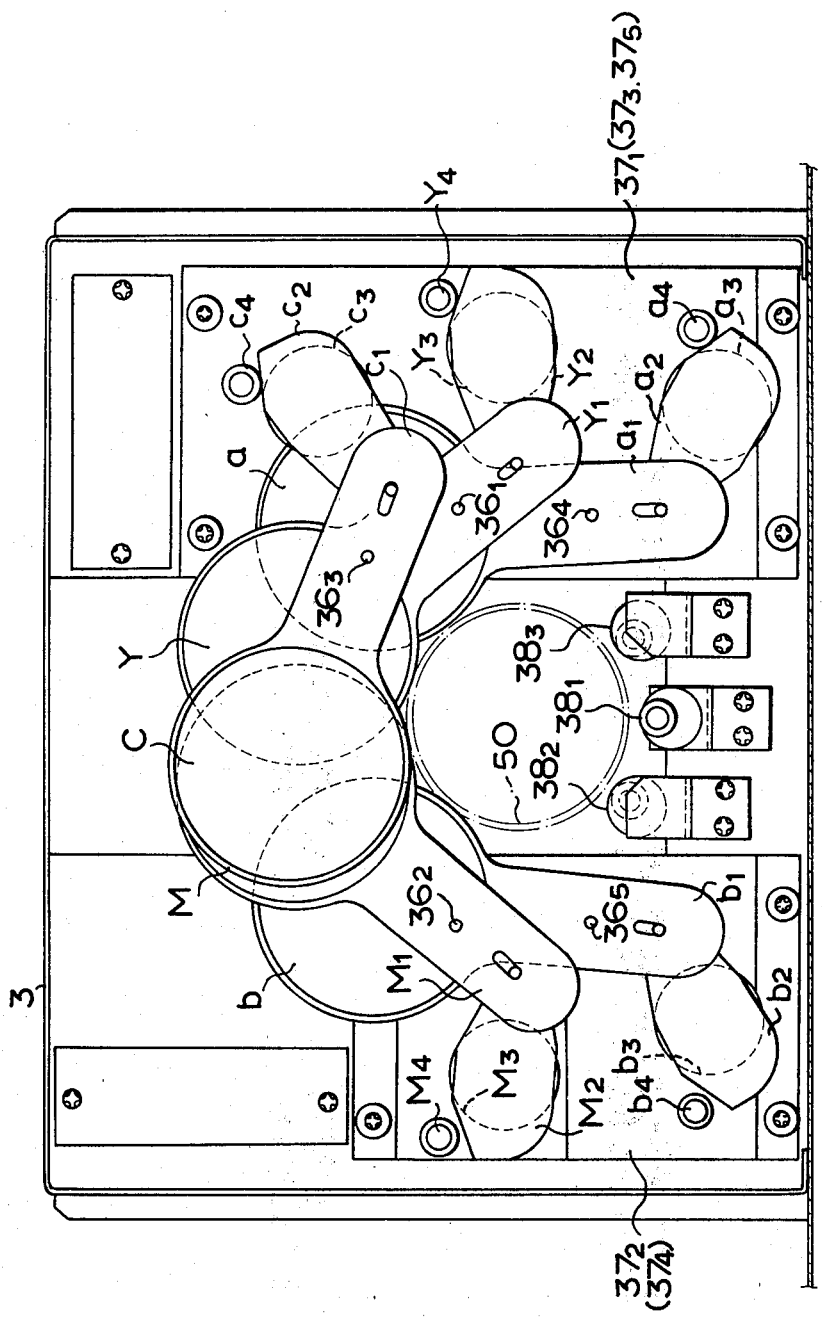

Now the cut filter assembly 33 which is one of essential components for practicing the present invention will be described below with reference to FIGS. 2 and 3.

As illustrated in the drawings, the cut filter assembly 33 comprises a combination of a yellow filter Y, a magenta filter M and a cyan filter C by means of which color balancing is ensured and another combination of two light beam flux reducing filters a and b. As illustrated in FIG. 3, the respective filters are pivotally supported in the light source box 3 in such a manner that their carriers $Y_1$, $M_1$, $C_1$, $a_1$ and $b_1$ are rotatably mounted on pivotal shafts $36_1$, $36_2$, $36_3$, $36_4$ and $36_5$ on mounting plates $37_1$, $37_2$, $37_3$, $37_4$ and $37_5$ fixedly secured to the light source box 3 so as to be protruded into or retracted from a light beam passage 50 which is extended from the light source 35 to the optical system 43, wherein the mounting plates $37_3$, $37_4$ and $37_5$ are not shown in the drawing. Further, the respective filter carriers are operatively connected to rotary solenoids $Y_3$, $M_3$, $C_3$, $a_3$ and $b_3$ by way of links $Y_2$, $M_2$, $C_2$, $a_2$ and $b_2$. In the drawing the reference numeral $38_1$ designates a stopper for the carriers $Y_1$ and $M_1$ of the filters Y and M, the reference numeral $38_2$ does a stopper for the carriers $C_1$ and $a_1$ of the filters C and a and the reference numeral $38_3$ does a stopper for the carrier $b_1$ of the filter b, whereas the reference letters $Y_4$, $M_4$, $C_4$, $a_4$ and $b_4$ designate a stopper for the links $Y_2$, $M_2$, $C_2$, $a_2$ and $b_2$ respectively.

When the color photo sensors 44 detect the light beam which has just passed through the negative color film, an electronic circuit (not shown) which is very familiar to any expert in the art is actuated to make a decision as to whether both the light beam flux reducing filters a and b should be put in operation or only the filter b should be in operation or both the filters a and b should not be in operation. Then it processes and stores a number of data concerning the order of operations of the respective filters Y, M and C, their operation starting time, shutter operation time and others.

In case that it is determined that both the filters a and b or only the filter b should be put in operation, when depressing an operation start button (not shown) they are protruded into the light beam passage 50 with the aid of the respective rotary solenoids $a_3$ and $b_3$ and links $a_2$ and $b_2$ in accordance with the instructions from the storage section in the electronic circuit, before the shutter 42 opens the light beam passage 50 for exposure. Then, after the shutter 42 opens the light beam passage 50, the filters Y, M and C are protruded into the light beam passage 50 with the aid of the respective rotary solenoids $Y_3$, $M_3$ and $C_3$ and links $Y_2$, $M_2$ and $C_2$. Then, after the shutter closes than light beam passage 50, all the members protruded thereinto are restored to the original positions.

In the meanwhile, in case that both the filters a and b are determined not to be in operation, just the filters Y, M and C are protruded into the light beam passage 50 and then they are restored to the original positions after completion of closure of the shutter 42.

It is to be noted that the light beam flux reducing filters a and b are a so-called ND filter (neutral density filter) or a mesh filter respectively and their light beam transmission rate may be same to 50%. Alternatively their light beam transmission rate may be specified such that one filter a has 75% light beam transmission rate and the other filter b has 50% light beam transmission rate. The light adjusting filter 34 is equipped with a turn-buckle mechanism which is manually operated for opening or closing the filter.

Next, operation of the printer constructed in the above-described manner will be described below.

Usually, the light adjusting filter 34 as well as the respective filters Y, M, C, a and b in the cut filter assembly 33 are dislocated from the light beam passage 50 and the shutter 42 is closed, as long as they are not in operation.

Prior to starting printing operation, the suitable light adjusting filter 34 is selected and manually operated to the light path in the conventional manner, taking into account the kind or nature of the light source lamp 35 and paper P. Next a negative color film is placed on the negative color film deck 12 and firmly secured thereon by means of the negative color film mask 13 and then the light source lamp 35 is turned on. When the plural color photo sensors 44 detect the light beam which has passed through the negative film, the electronic circuit (not shown) makes a decision in accordance with the electrical signals delivered from the optical sensor 44 as to whether any of the filters a and b should be put in operation or not. When a decision is made that any of the filters should be in use, the suitable number of the filters to be used is decided and then stored in the electronic circuit. Specifically, when the negative color film has an overexposure, a decision is made such that the light reducing filters a and b should not be in use, when it has a normal exposure, a decision is made such that just the filter b should be in operation, and when it has an underexposure, a decision is made such that both the filters a and b should be in use, and then the data regarding the decision are stored in the electronic circuit. Subsequently, another decision is made with respect to the order of operations of the three cut filters comprising the yellow filter Y, magenta filter M and cyan filter C, operation starting time and shutter opening and closing time and thereafter the data regarding the decision are stored in the electrical circuit.

When depressing the operation start button (not shown), the light beam flux reducing filters a and b are displaced at the predetermined position in accordance with the instructions from the storage section in the electronic circuit, depending on the darkness of the negative color film, prior to opening the light beam passage 50. Then the shutter 42 opens the light beam passage 50 and thereafter the respective color balancing filters Y, M and C are separately protruded into the light beam passage 50. Then, the intended exposure for printing is achieved by closing the shutter and thereafter the respective members are retracted from the light beam passage 50 to resume the original position. As a result a single cycle of printing operation is completed and at the same time next printing operation is ready for starting.

Alternatively, the light beam flux reducing filters a and b may be operated in a different manner as follows. First, the light beam flux reducing filter b is previously protruded into the light beam passage 50. When it is found that the negative color film has an underexposure, the other filter a is operated to advance into the light beam passage 50 from the outside area, whereas when it is found that it has an overexposure, the filter b is operated to move out of the light beam passage 50.

As will be readily understood from the above description, the printer in accordance with the present invention has advantages that printing time required for a so-called overexposed negative color film can be remarkably shortened without any loss in color balancing by means of the technical step of magnifying the intensity of a light beam from light source and moreover the extent of fluctuation in printing time can be reduced, said fluctuation being caused by an overexposure or underexposure of a color photographic film when a photograph is taken.

What is clamimed is:

1. A printer for exposing and printing a color printing paper with a certain color balance properly maintained by means of a cut filter assembly comprising three cut filters of a yellow filter, magenta filter and cyan filter each of which is actuated by signals delivered from a plurality of color photo sensors, wherein two light beam flux reducing filters contained in said cut filter assembly are put in use under such an operating condition that the intensity of a light beam coming up from a light source for exposure is previously increased to a predetermined level so as to properly correspond to a negative color film which has an overexposure when a photograph is taken, one of said light beam flux reducing filters being intended for reducing the light beam flux when the negative color film has a normal exposure, while the other one being intended for reducing the light beam flux in cooperation with said first one when the negative color film has an underexposure, said first one being normally inserted into a light beam passage and being adapted to be removed therefrom when printing is performed with a negative color film which has an overexposure, whereby quick printing is ensured with the minimized fluctuation in printing time, maintaining an excellent color balance, irrespective of the fact that the negative color film has either an overexposure or underexposure when the photograph has been taken.

2. A printer as set forth in claim 1, wherein the light source comprises a halogen lamp.

3. A printer as set forth in claim 1, wherein the respective light beam flux reducing filters are a neutral density filter.

4. A printer as set forth in claim 1, wherein the respective light beam flux reducing filters are a mesh filter.

5. A printer as set forth in claim 1, wherein the respective light beam flux reducing filters have the same light beam transmission rate.

6. A printer as set forth in claim 1, wherein one of the light beam flux reducing filters has 75% light beam transmission rate and the other one has 50% light beam transmission rate.

* * * * *